(12) United States Patent
Lehnert et al.

(10) Patent No.: US 11,974,106 B2
(45) Date of Patent: Apr. 30, 2024

(54) ARRAY AUGMENTATION FOR AUDIO PLAYBACK DEVICES

(71) Applicant: Sonos, Inc., Santa Barbara, CA (US)

(72) Inventors: Hilmar Lehnert, Framington, MA (US); Chris Davies, Santa Barbara, CA (US); Paul MacLean, Quincy, MA (US)

(73) Assignee: Sonos, Inc., Santa Barbara, CA (US)

( * ) Notice: Subject to any disclaimer, the term of this patent is extended or adjusted under 35 U.S.C. 154(b) by 89 days.

(21) Appl. No.: 17/451,037

(22) Filed: Oct. 15, 2021

(65) Prior Publication Data
US 2022/0124434 A1   Apr. 21, 2022

Related U.S. Application Data

(60) Provisional application No. 63/198,430, filed on Oct. 16, 2020.

(51) Int. Cl.
*H04R 3/12* (2006.01)
*H04N 21/436* (2011.01)
(Continued)

(52) U.S. Cl.
CPC ......... *H04R 3/12* (2013.01); *H04N 21/43615* (2013.01); *H04R 5/04* (2013.01);
(Continued)

(58) Field of Classification Search
None
See application file for complete search history.

(56) References Cited

U.S. PATENT DOCUMENTS 5,440,644 A   8/1995   Farinelli et al.
5,761,320 A   6/1998   Farinelli et al.
(Continued)

FOREIGN PATENT DOCUMENTS

EP   1389853 A1   2/2004
WO   200153994   7/2001
(Continued)

OTHER PUBLICATIONS

AudioTron Quick Start Guide, Version 1.0, Mar. 2001, 24 pages.
(Continued)

*Primary Examiner* — Paul W Huber
(74) *Attorney, Agent, or Firm* — Fortem IP LLP

(57) ABSTRACT

Systems and methods for providing augmented arrays for audio playback are disclosed. An example playback device includes a first transducer configured to output audio along a first acoustic axis and a second transducer configured to output audio along a second acoustic axis. The playback device is configured to receive a source stream of audio content including at least a first input channel and a second input channel. The device plays back first audio output via the first transducer based on the first input channel and directed along the first acoustic axis, and plays back second audio output via the second transducer based on the second input channel and directed along the second acoustic axis, wherein the second audio output at least partially cancels the first audio output along a first spatial region offset from the first acoustic axis.

17 Claims, 11 Drawing Sheets

(51) Int. Cl.
*H04R 5/04* (2006.01)
*H04R 25/00* (2006.01)
*H04S 7/00* (2006.01)

(52) U.S. Cl.
CPC ........... *H04R 25/407* (2013.01); *H04S 7/307* (2013.01); *H04R 2205/024* (2013.01); *H04R 2205/026* (2013.01); *H04R 2420/07* (2013.01)

(56) References Cited

U.S. PATENT DOCUMENTS

| | | |
|---|---|---|
| 5,923,902 A | 7/1999 | Nagaki |
| 5,953,432 A | 9/1999 | Yanagawa et al. |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Ambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 9,877,131 B2 | 1/2018 | Grosche et al. |
| 10,531,221 B1 * | 1/2020 | Moore ................... H04S 7/303 |
| 10,771,896 B2 * | 9/2020 | Bharitkar ................ H04S 1/002 |
| 10,945,090 B1 * | 3/2021 | Choisel ................... H04S 7/303 |
| 11,172,288 B1 * | 11/2021 | Mathur ................ H04R 1/2873 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |

FOREIGN PATENT DOCUMENTS

| | | |
|---|---|---|
| WO | 2003093950 A2 | 11/2003 |
| WO | 2007113718 A1 | 10/2007 |
| WO | 2013016735 A2 | 1/2013 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Search Report and Written Opinion mailed on Feb. 11, 2022, issued in connection with International Application No. PCT/US2021/071901, filed on Oct. 15, 2021, 12 pages.

* cited by examiner

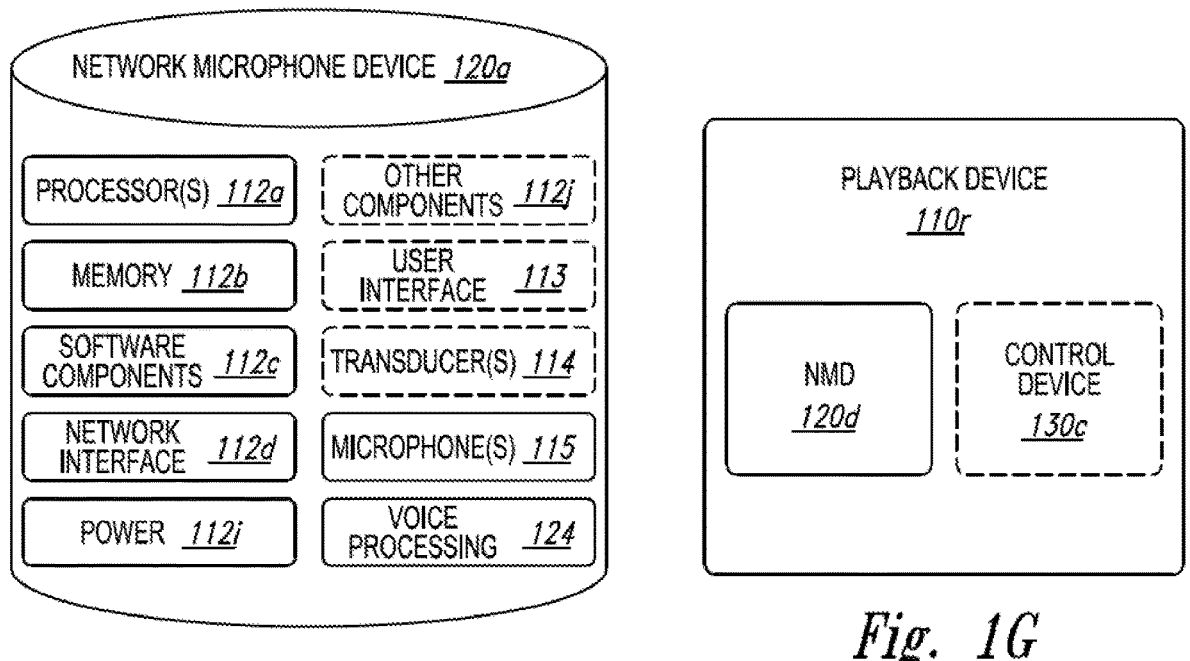
Fig. 1F
Fig. 1G
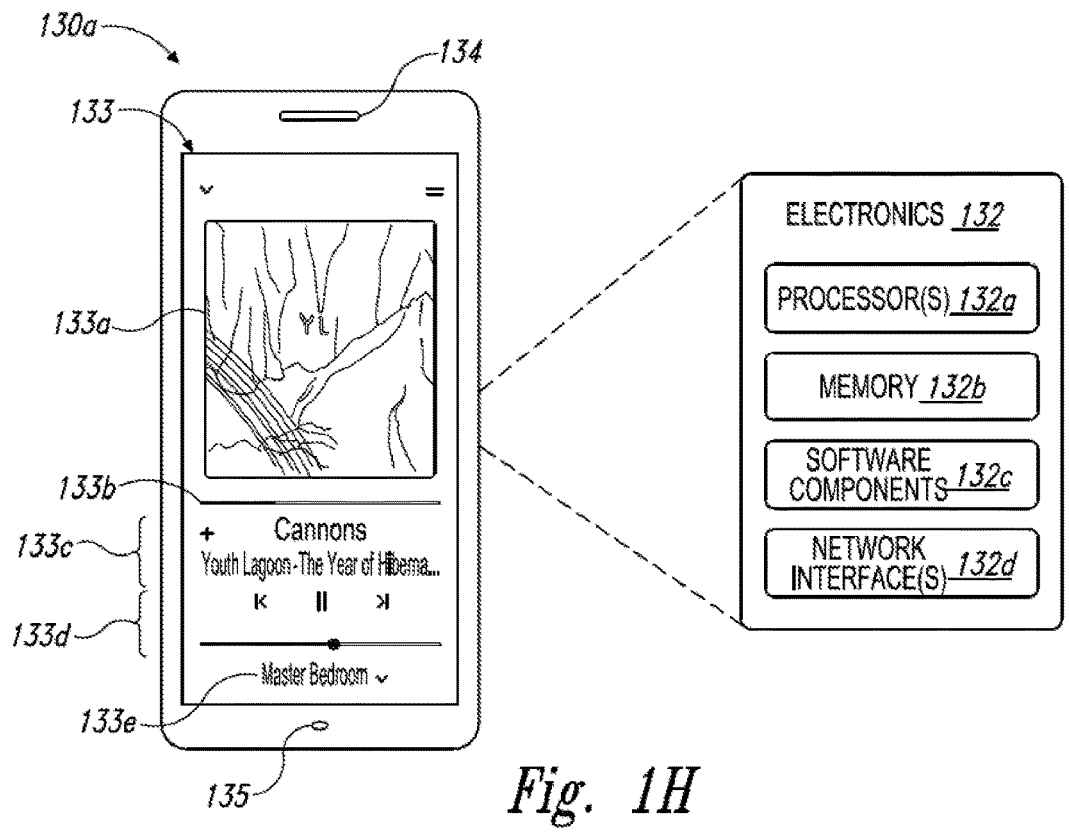
Fig. 1H

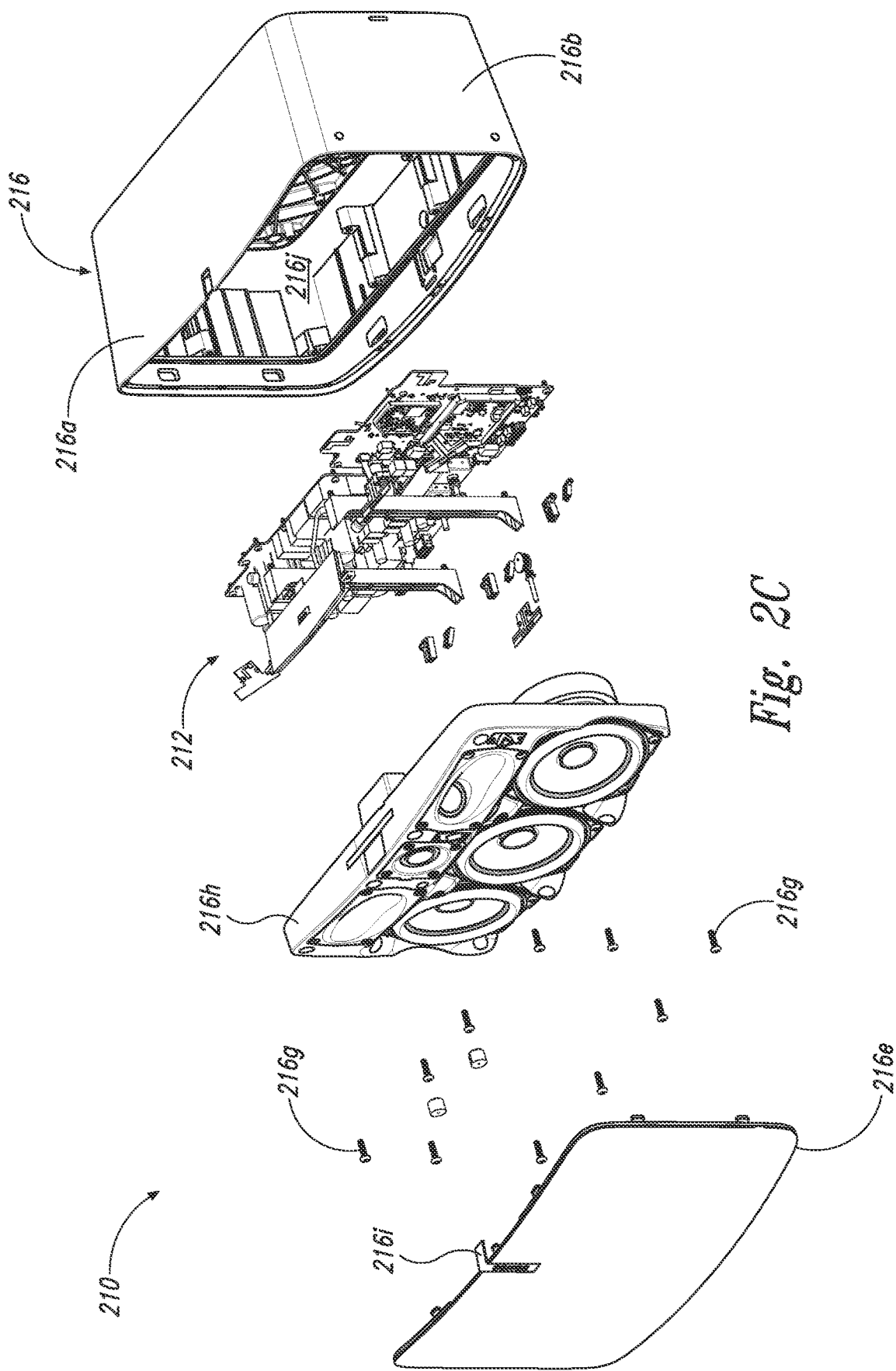

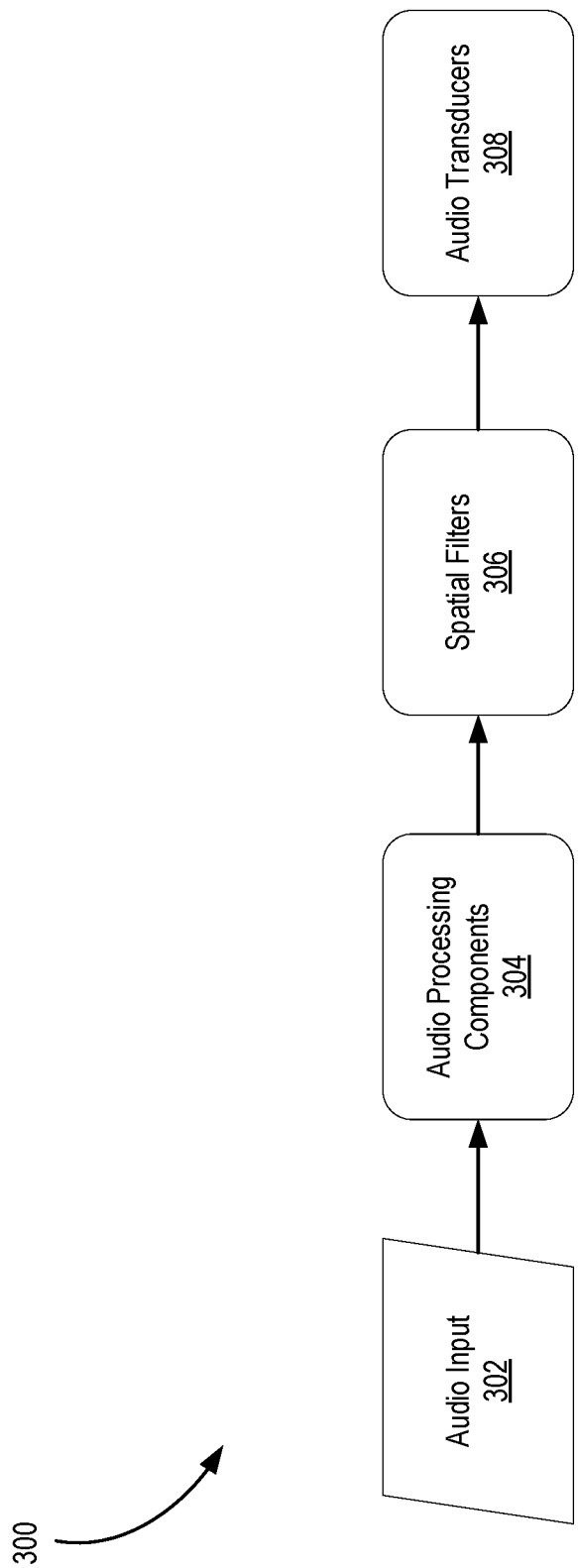

ARRAY AUGMENTATION FOR AUDIO PLAYBACK DEVICES

CROSS-REFERENCE TO RELATED APPLICATION

This application claims the benefit of priority to U.S. Patent Application No. 63/198,430 filed Oct. 16, 2020, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIG. 2C is an exploded view of the playback device of FIG. 2A.

FIG. 3 is a block diagram of an audio processing system including spatial filters, in accordance with aspects of the disclosed technology.

Figure 1A:
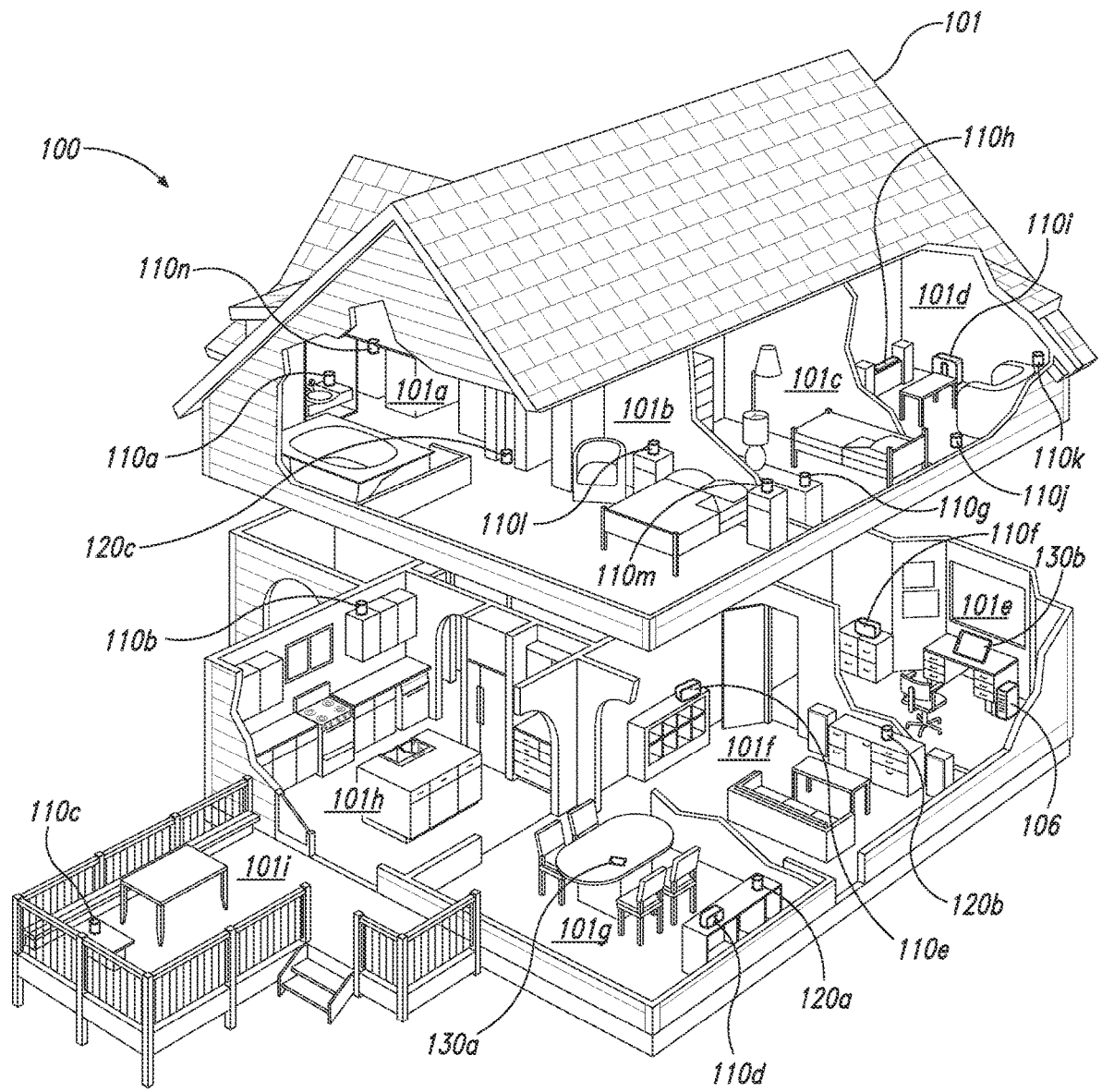
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments of the present disclosure relate to improved systems and methods for processing audio inputs to produce output signals to transducers of a playback device. A playback device may include a plurality of transducers arranged in an array and controlled by one or more signal processors that drive the output of each transducer. The array of transducers can be used to shape sound and achieve the desired psychoacoustic effects for a listener, such as perceived spaciousness, directionality, and immersiveness. For example, an audio input having left, right, and center channels may be output via a multi-transducer playback device using an array transfer function that determines which transducer(s) of the playback device play back which input signals and how. In a simplified approach, each input channel can have one or more dedicated transducers—for example a left transducer that outputs only left channel audio along a first acoustic axis, a right transducer that outputs only right channel audio along a second acoustic axis, etc. In practice, however, more desirable psychoacoustic effects can be achieved by leveraging the output of multiple transducers for output of each channel, with some or all of the transducers contributing to more than one output channel. For example, an array of transducers can achieve a spatial filtering or beamforming effect, in which different transducers respond to the same input signal in different ways (e.g., by slightly delaying the signal, playing at different volumes, or using cancellation effects) to control the size, shape, and direction of the acoustic wave for a given input signal. Such spatial filtering can be used to achieve increased directionality in output, such that, for example, a right channel audio output is directed over a narrower spatial range and/or along an acoustic axis that is oriented in a favorable direction. This directionality can also increase the spatial separation between left and right outputs, for example, by effectively steering the sound axes in the desired directions and/or by narrowing a spatial output range for at least certain frequency ranges.

In playback devices utilizing relatively few transducers, it can be challenging to achieve the desired spatial filtering effects. Additionally, playback devices having a relatively compact form factor can also present challenges for spatial filtering, due to the small physical distance between the various transducers. As described in more detail herein, embodiments of the present technology enable playback devices to achieve improved directionality even when only using a small number of transducers (e.g., three transducers for output of a three-channel audio signal) and/or while the transducers are positioned adjacent one another with little physical separation between them.

In some embodiments, the transducers of a playback device may be arranged to form one or more sound axes, each of which may correspond to a channel of audio content. For example, a playback device might include three audio transducers which provide multiple acoustic axes (e.g., corresponding to audio outputs of left, right, and center sound channels). In some instances, each acoustic axis may have a corresponding "lead transducer," which is primarily responsible for the audio channel output along that acoustic axis. For example, a soundbar playback device may include a left transducer, right transducer, and center transducer, each of which respectively plays back primarily left, right, and center channel audio.

To increase the directivity for a given audio channel, the playback device may utilize augmentation effects (e.g., destructive or constructive interference) outside of the target spatial region (e.g., a spatial region centered along the acoustic axis). For example, right channel audio may be output primarily by a right transducer along a first acoustic axis. In the absence of any augmentation effects, the output of the right channel audio may extend over a given spatial region, which may "leak" undesirably beyond a target spatial region, for example extending too far towards a target spatial region for a center or left channel audio output. To increase directivity of output of the right channel audio, some or all of the non-lead transducers (e.g., the left and center transducers) can be used to output offsetting audio that at least partially cancels the right channel audio. Because this cancelling audio will be output along different acoustic axes, the cancellation effects can be greatest in areas that are spatially offset from the target acoustic axis, resulting in higher directivity for the right channel output. In some instances, the leakage can be particularly pronounced or particularly problematic over certain frequency ranges (e.g., between about 250 Hz to about 500 Hz), and as such the cancellation effects provided by offsetting audio can be tailored to particular frequency ranges. Additionally or alternatively, some or all of the non-lead transducers can output augmenting audio that constructively interferes with the right channel audio over a given spatial region, thereby spatially widening the combined output of the right channel audio.

As described in more detail below, this augmenting audio can be generated using an array transfer function that generates particular output for given transducers based on input audio signals. As used herein, an array transfer function can be generated as a combination of a "lead array," which maps a given audio input channel to its corresponding lead transducer(s), and an "augmentation array," which generates offsetting audio output to be played back by non-lead audio transducers. The augmentation array, in other words, can provide audio played back via non-lead transducer(s) in a manner that improves the directionality or other spatial properties of the overall audio output for that particular channel. Additionally, because this approach relies on lead transducers to primarily drive output for particular channels, the playback device can operate more efficiently than, for example, approaches that involve more complex array transfer functions in which all or many transducers contribute to playback of each channel. In some embodiments, the lead array can be "flat" with respect to the audio input, for example by not significantly altering the audio input to be output via the lead transducer. As a result, during playback the lead transducer can play back the corresponding input channel of audio content without significantly alteration via the array transfer function (or other spatial filter), while the non-lead transducers may play back augmenting audio that has been significantly altered via the array transfer function. In some examples, the augmenting audio includes only audio output over a given, smaller, frequency range (e.g., between about 250-500 Hz) and is configured to destructively interfere with the audio output via the lead transducer.

As one example, consider a playback device having a right transducer oriented along a right sound axis, a center transducer oriented along a center sound axis, and a left transducer oriented along a left acoustic axis. For a given audio input that includes left, right, and center channels, each of the transducers can serve as a lead transducer for the corresponding input. The array transfer function that generates output signals for the various transducers based on a three-channel audio input can include a lead array that causes each lead transducer to primarily play back audio for its respective channel (e.g., the right lead transducer plays back right channel audio, etc.). In some embodiments, the respective channel inputs are not significantly altered for playback via the lead transducers as a result of the array transfer function. The array transfer function also includes augmentation arrays that cause each non-lead transducer to play back offsetting or augmenting audio for its non-lead channels in a manner that enhances the directivity of those non-lead channels. For example, the center and left transducers can output offsetting audio that enhances the directivity or other spatial effects of the right channel audio (which is output primarily by the right transducer). At the same time, the right and left transducers can output offsetting audio that enhances the directivity or other spatial effects of the center channel audio (output primarily by the center transducer), and the right and center transducers can output offsetting audio that enhances the directivity or other spatial effects of the left channel audio (output primarily by the center transducer). As such, each transducer can simultaneously output both (1) audio corresponding to a particular channel for which it is a lead transducer and (2) offsetting audio that enhances the directivity of the other channels for which it is not a lead transducer. As noted above, this combined output can be generated using an array transfer function that incorporates a lead array and an augmentation array.

Although several examples described herein utilize a single transducer as a "lead transducer," in various embodiments two or more transducers can together serve as "lead transducers," for example being primarily responsible for outputting a given channel of audio output. Additionally, any number of non-lead transducers can be used to output offsetting audio (e.g., via an augmentation array), including instances in which only a single non-lead transducer outputs offsetting or augmenting audio.

According to some aspects, the present technology includes a method for processing audio that involves receiving, at a playback device, a source stream of audio content having input including at least a first input channel and a second input channel. The playback device can play back, via a first transducer, first audio output along a first acoustic axis that is based on the first input channel. The playback device can simultaneously play back, via a second transducer, second audio output based on the first input channel, wherein the second audio output at least partially cancels the first audio output along a spatial region offset from the first acoustic axis. In this manner, the second audio output provided by the second transducer augments the directionality of the first audio output provided by the first transducer. At the same time, the playback device can play back, via the second transducer, third audio output along a second acoustic axis and based on the second input channel, while also playing back, via the first transducer, fourth audio output based on the second input channel. The fourth audio output can at least partially cancel the third audio output along a second spatial region offset from the second acoustic axis. As such, the fourth audio output via the first transducer augments the directionality of the third audio output via the second transducer.

In accordance with aspects of the present technology, a method includes receiving audio input at a playback device comprising a plurality of transducers including a lead transducer and one or more augmenting transducers. The playback device spatially filters the audio input to provide a lead output configured to be played back via the lead transducer and an augmenting output configured to be played back via the augmenting transducer(s). The lead output may be substantially unaltered with respect to the audio input by the spatial filtering, while the augmenting output may be substantially altered with respect to the audio input by the spatial filtering. The method further includes playing back, via the lead transducer, the lead output, and playing back, via the augmenting transducer(s), the augmenting output. In some embodiments, the augmenting output augments (e.g., offsets, diminishes, enhances, or otherwise changes) a directionality of the lead output.

As explained in more detail below, processing a source stream of audio content in such a manner (e.g., using an array transfer function that combines lead and augmentation arrays) provides an improved psychoacoustic experience for the listener. Without being bound by theory, this improved experience may be due at least in part to increased directivity for particular channels at least over certain frequencies. As such, the input signals, after being arrayed via one or more transfer functions, can be played via multiple channels of the playback device(s) while maintaining sufficient directionality, thereby resulting in a better psychoacoustic experience for the listener.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and/or output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers or one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
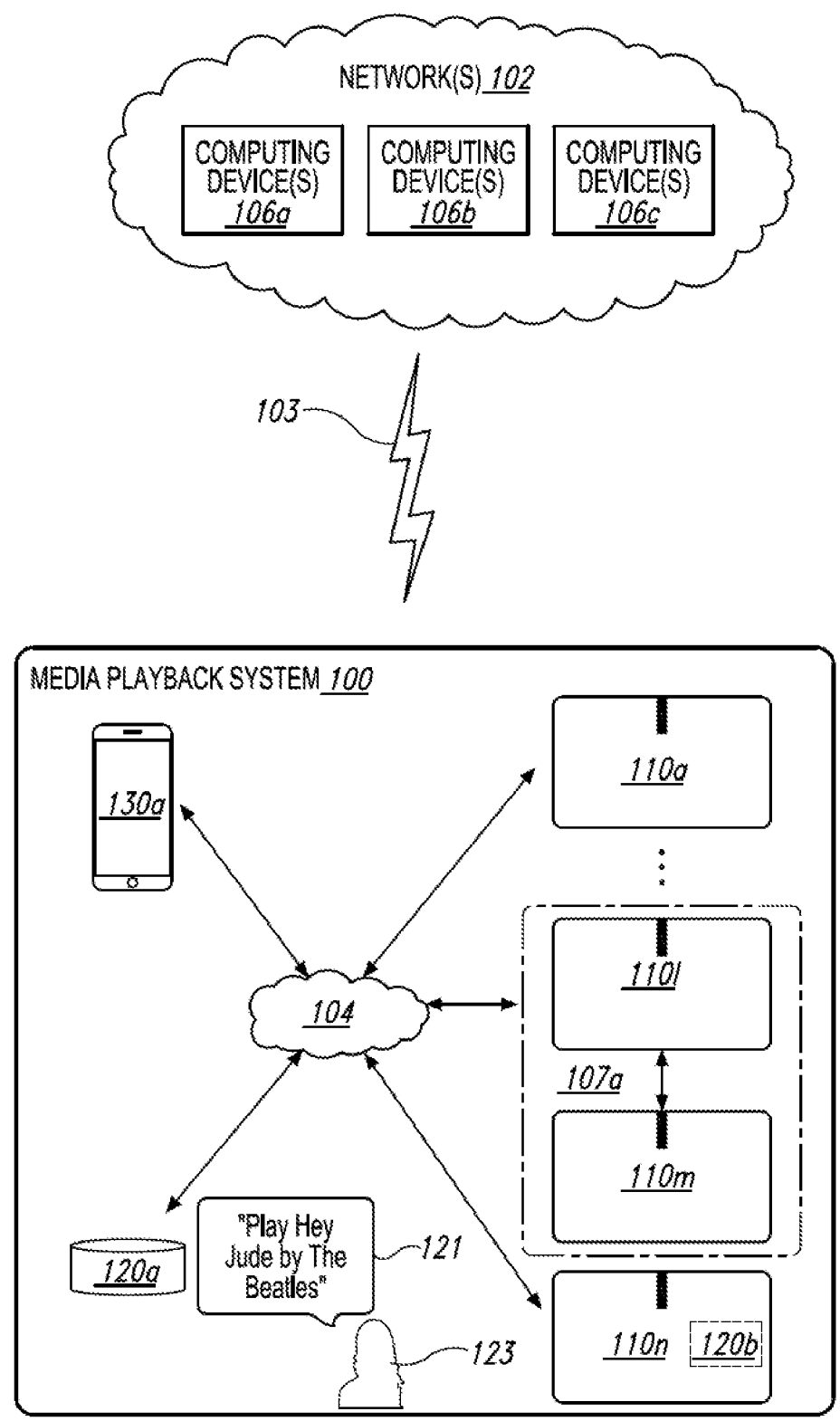
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
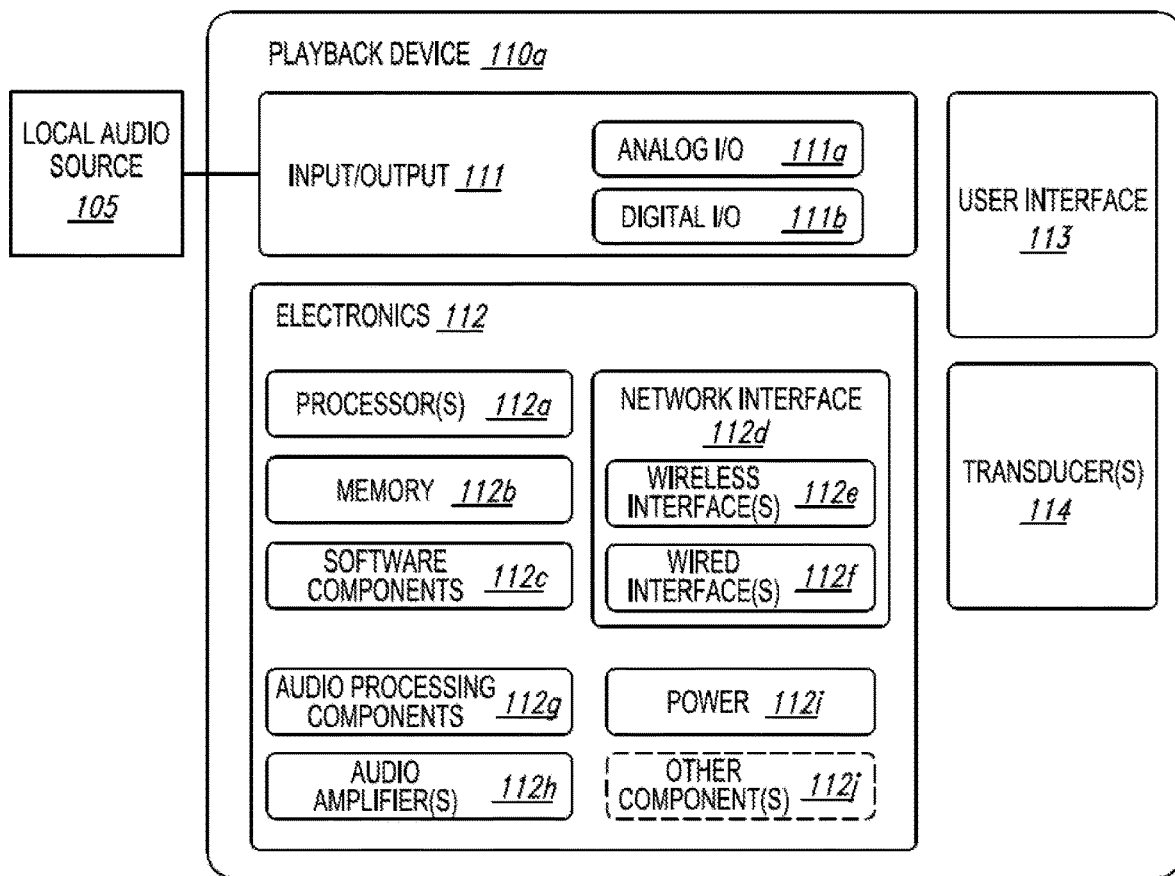
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
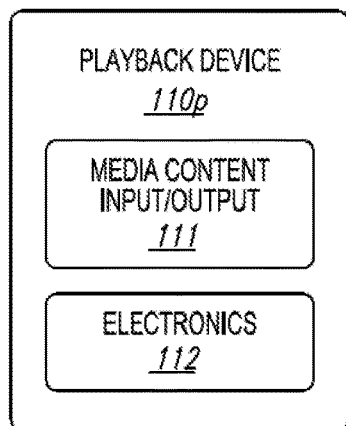
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
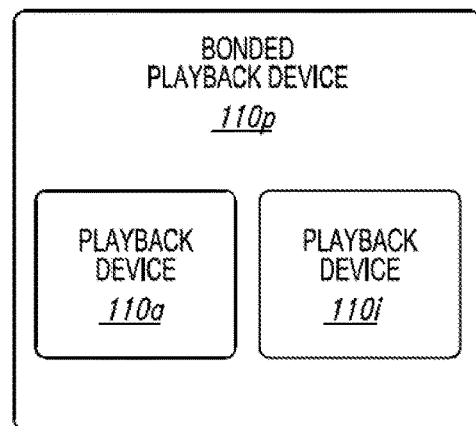
FIG. 1E is a block diagram of a bonded playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device examples are described in further detail below with respect to FIGS. 2A-2C.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 132a to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130 to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Playback Devices

Figure 2A:
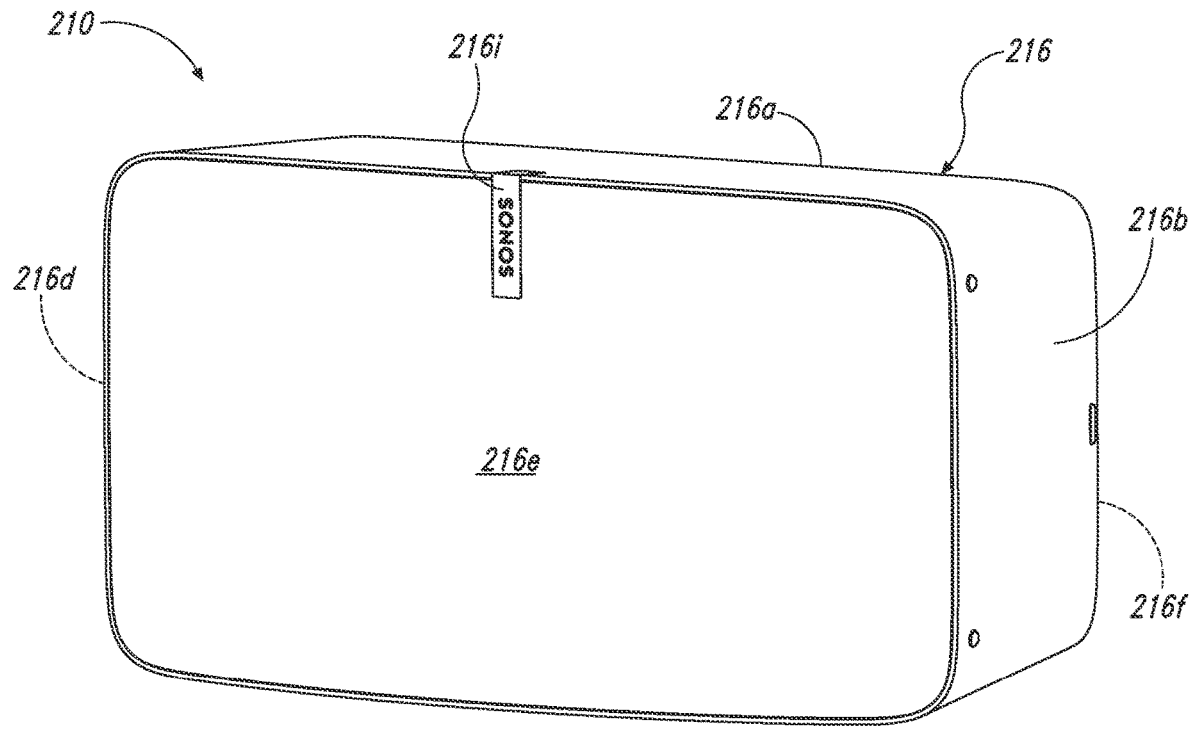
FIG. 2A is a front isometric view of a playback device configured in accordance with examples of the disclosed technology.
Figure 2B:
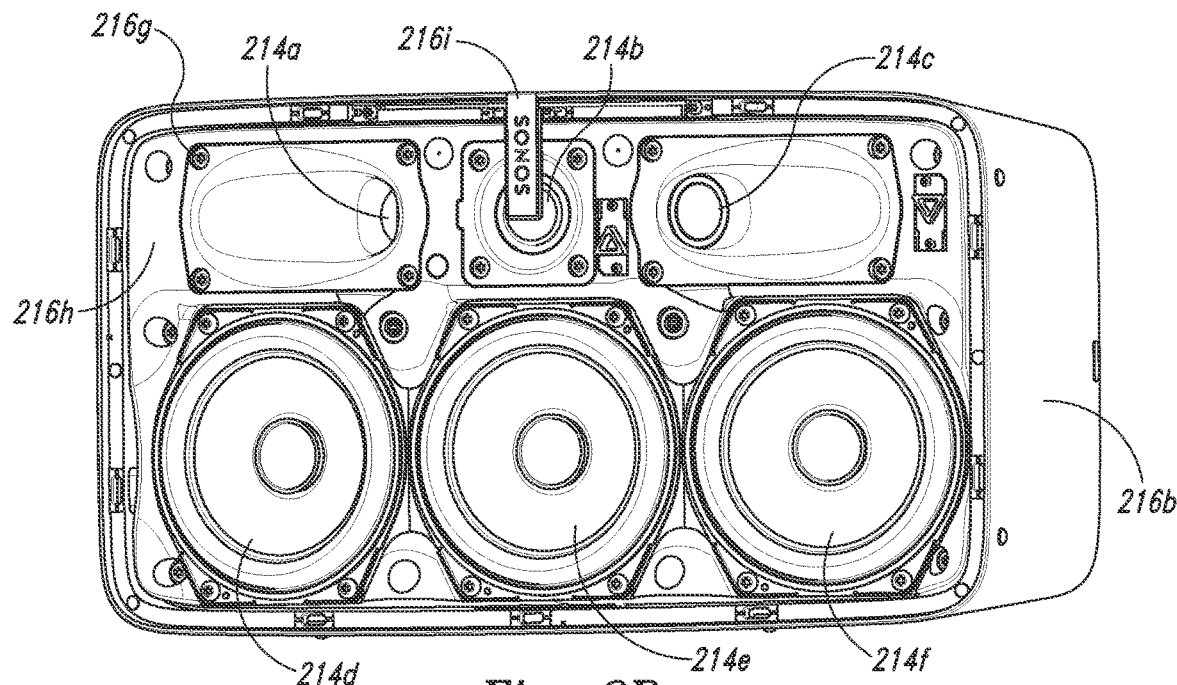
FIG. 2B is a front isometric view of the playback device of FIG. 2A without a grille.

FIG. 2A is a front isometric view of a playback device 210 configured in accordance with examples of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some examples, the playback device 210 includes a number of transducers different than those illustrated in FIGS. 2A-2C.

For example, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some examples, however, the playback device 210 omits the filter 216i. In other examples, the playback device 210 includes one or more additional filters aligned with the transducers 214b and/or at least another of the transducers 214.

IV. Example Systems and Methods for Processing Audio Input

A playback device can be configured to play back audio multi-channel content over multiple sound axes, which can enhance a listener's experience by allowing the listener to perceive a balanced directional effect. In the case of playback devices having relatively few transducers, each channel can be associated with a particular lead transducer that is primarily responsible for output of that audio content. In some instances, however, the output of the lead transducer(s) may provide insufficient directionality, leading to a poor psychoacoustic experience for the listener. As previously described, this poor experience may be due to, for example, the directional "leakage" of audio output away from the acoustic axis of the corresponding lead transducer.

Embodiments of the present disclosure can address these and other problems by using array transfer functions that designate one or more lead transducers to be primarily responsible for outputting a given audio channel, in combination with augmentation of that output via offsetting audio output via one or more non-lead transducers. Such array transfer functions combine a lead array that drives each input channel to its corresponding lead transducer for output and an augmentation array that drives some or all of the transducers to output offsetting audio to enhance the directionality of other transducers of the playback device.

In various examples, such augmenting or offsetting audio output can be configured to cancel and/or destructively interfere with the other audio output via the lead transducer(s) at least over a given spatial region. In some instances, the offsetting audio output is approximately 180 degrees out of phase with the audio output that it is configured to augment. This phase offset can extend over the entire frequency range, or only over a predefined frequency range (e.g., between about 250 Hz and about 500 Hz in some examples). In some instances, the offsetting audio can at least partially cancel the audio output via the lead transducer(s) over a spatial region that is offset from an acoustic axis of the lead transducer(s). For example, the spatial region may be angularly offset from the acoustic axis associated with the lead transducer(s) by at least about 15 degrees, about 30 degrees, about 45 degrees, or more.

Additionally or alternatively, the augmenting audio output can be configured to add or constructively interfere with the other audio output via the lead transducer(s), whether over a given frequency range or over a sub-set of the total frequency range played back by the playback device. In such instances, the augmenting audio can spatially widen the combined output as compared to output via the lead transducer alone.

In operation, any given transducer of a playback device may simultaneously serve as a lead transducer for outputting a given channel of audio output while also serving as a non-lead transducer for other channels (e.g., by playing back offsetting or augmenting audio configured to enhance the directionality of those other channels). Producing audio output signals in such a manner can enhance directivity, spaciousness, and immersiveness, thereby resulting in a better psychoacoustic experience for the listener.

FIG. 3 is a block diagram of a system 300 including spatial filters, in accordance with embodiments of the disclosed technology. In some embodiments, the system 300 can form a part of the electronics 112 of the playback device 110a (FIG. 1C). As shown in the illustrated embodiment, audio input 302 is received by audio processing components 304 of a playback device. The audio input 302 can include standalone audio content (e.g., music) and/or video-associated audio content (e.g., television or movie audio), and may be retrieved from multiple audio content sources. For example, the audio input 302 may be retrieved by the playback device over a network via one or more other playback devices or network devices, or retrieved by a playback device directly from a corresponding audio content source (e.g., a line-in connection). The audio content of the audio input 302 can include multiple input channels (e.g., two, three, four, or more input channels). Standalone audio content, for example, can include two input channels (e.g., left and right input channels), three input channels (e.g., left, right, and center input channels), or four or more input channels. As another example, video-associated audio content can include three input channels (e.g., left, right, and center input channels), or four or more input channels.

As shown in the illustrated embodiment, the audio processing components 304 are configured to receive the audio input 302 and alter the audio input 302 to generate input signals with different aspects or parameters (e.g., different frequencies, amplitudes, etc.). In some embodiments, for example, the audio input 302 includes a first input channel (e.g., a left input channel) and a second input channel (e.g., a right input channel). The first and second input channels can be altered, e.g., via the audio processing components 304, to generate input signals with different parameters than those of the first and/or second input channels. This processing can include, for example upmixing, downmixing, adjusting gain, or any other suitable modification of the input channels.

Still referring to FIG. 3, the input signals are provided to a set of spatial filters 306. The spatial filters 306 can process the input signals by, for example, applying one or more array transfer functions to the input signals to produce audio output signals, which are then supplied to a plurality of audio transducers 308. For example, the array transfer function can be applied to the left and right input signals to produce a right lead output signal, a left lead output signal, a right augmentation output signal (for output via non-right transducers), and a left augmentation output signal (for output via non-left transducers). The combination of these output signals can correspond to the audio output signal provided to individual transducers of the audio transducers 308.

For example, the first and second input channels can be used to produce both lead arrays (e.g., including a left lead output by a left transducer and a right lead output by a right transducer) and augmentation arrays (e.g., a left augmentation array for output by non-left transducer(s) and a right augmentation array for output by non-right transducer(s)). Although referred to in some instances as separate arrays, one of skill in the art will understand that these different arrays can be mathematically combined into a single array for simultaneous processing of audio input to achieve the desired output to particular transducers.

The array transfer functions applied to the generated input signals may vary based on a number of factors, including the number of input channel signals of the received audio content, the type of received audio content (e.g., standalone audio or video-associated audio), the number of channels or sound axes of the playback device, and/or the number of transducers or audio drivers associated with each of the channels or sound axes of the playback device, amongst other factors.

The array transfer function(s) utilized to provide audio for a first audio output channel or set of transducers may differ from the array transfer function(s) utilized to provide audio for a second audio output channel or set of transducers. For example, the array transfer functions used when the expected number of audio output channels is two channels (e.g., left and right channels) may differ from the array transfer functions used when the expected number of audio output channels is three channels (e.g., left, right, and center channels) or more. As another example, the array transfer function(s) used when the playback device or channel includes four transducers may differ from the array transfer function(s) used when the playback device or channel includes six transducers. In such embodiments, the audio output signal received from the filters 306 by the individual audio transducers 308 varies depending on the total number of audio output channels or transducers used during playback.

As previously noted, the audio output signals produced by applying the array transfer function(s) to the generated input signals are provided to the audio transducers 308. The plurality of audio transducers 308 can include two or more (e.g., three, four, five, six, seven, eight, nine, etc.) audio transducers of a playback device. In addition to or in lieu of the foregoing, the audio transducers 308 can be housed in multiple separate playback devices (e.g., two, three, four, five, or more playback devices) of a media playback system. In operation, the transducers or audio drivers may be arrayed to form a plurality of acoustic axes, each of which may correspond to an input channel of audio content. For example, a playback device (e.g., a soundbar type device) might include three or more audio transducers which form multiple sound axes (e.g., left, right, and center sound channels). Any audio transducer may contribute to any number of sound axes. For example, a left axis of a sound system may be formed via contributions from all three audio transducers in the example soundbar type device. Alternatively, an axis may be formed by a single audio transducer.

Example media playback systems described herein may adopt various playback configurations representing respective sets of sound axes. Example playback configurations may include respective configurations based on the number of input channels (e.g., mono, stereo, surround, or any of the above in combination with a subwoofer). Other example playback configurations may be based on the content type. For instance, a first set of axes may be formed by audio transducers of a media playback system when playing standalone audio, and a second set of axes formed by the audio drivers when playing video-associated audio. Other playback confirmations may be invoked by various groupings of playback devices within the media playback system.

Figure 4:
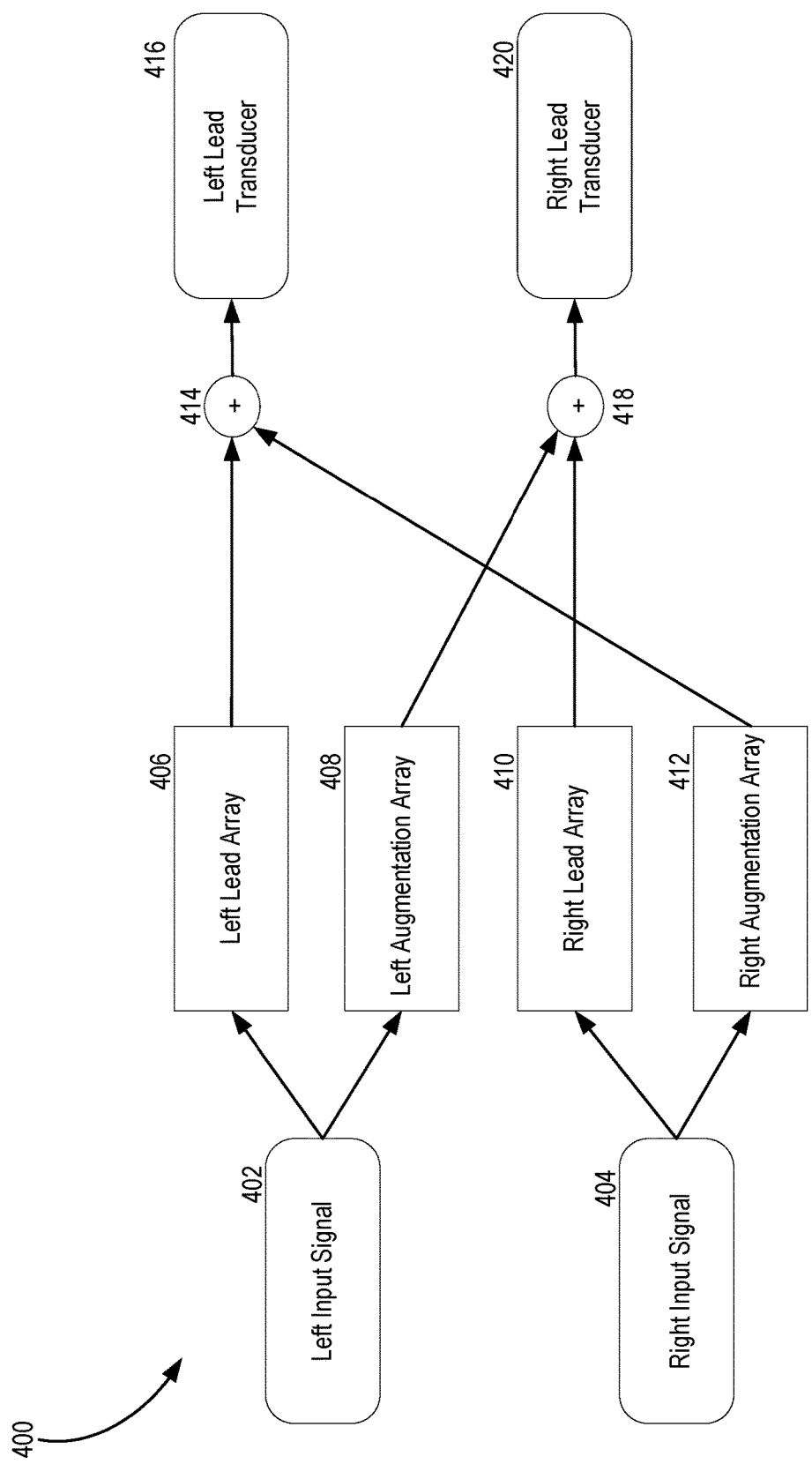
FIG. 4 is a functional block diagram of a system including an example set of spatial filters for processing an audio input, in accordance with aspects of the present technology.

FIG. 4 is a functional block diagram of a system 400 including spatial filters for processing an audio input, in accordance with aspects of the present technology. As shown in the illustrated embodiment, the system 400 includes a left input signal 402 and a right input signal 404. The system 400 shown in FIG. 4 is a simplified illustration that includes only left and right channel inputs. However, the techniques described herein can be extended to additional input and output channels (e.g., three, four, five or more input channels). Additionally, the techniques described herein can be applied to single-channel playback devices (e.g., a playback device used as a surround-sound device and configured to play back only left-channel audio content).

As shown in FIG. 4, the left and right input signals 402, 404 are provided to a plurality of spatial filters in the form of arrays. In particular, the left input signal 402 is provided to a left lead array 406 and a left augmentation array 408, while the right input signal 404 is provided to a right lead array 410 and a right augmentation array 412. These arrays can be combined (e.g., via module 414) such that the left lead array 406 and right augmentation array 412 are together delivered to the left lead transducer 416 for playback. Similarly, the left augmentation array 408 and the right lead array 410 are combined (e.g., via module 418) and delivered to the right lead transducer 420 for playback. In operation, the left lead transducer 416 playing back the left lead array 406 results in a left channel output directed primarily along a left acoustic axis by the left lead transducer 416. The directivity of this output can be augmented by the left augmentation array 408 as output via the right lead transducer 420. For example, in at least a spatial region where the output of the left lead transducer 416 and the right lead transducer 420 overlap, the left augmentation array 408 output can offset (e.g., at least partially cancel or destructively interfere with) the left lead array 406 output via the left lead transducer 416. This offsetting audio can enhance the directivity or otherwise modify the spatial properties of the left channel audio as perceived by a listener.

Similarly, the right lead transducer 420 playing back the right lead array 410 can result in a right channel output directed primarily along a right acoustic axis by the right lead transducer 420. This output can be augmented (e.g., the directivity can be improved, or other spatial properties modified) by interaction between this output and the output of the right augmentation array 412 via the left lead transducer 416. Such interaction can occur principally or at least in a spatial region in which the output of the left lead transducer 416 and the output of the right lead transducer 420 overlap with one another.

In some embodiments, the right lead array 410 does not significantly alter the right input signal, such that the right lead transducer 420 plays back substantially the right input signal without spatial modification via the right lead array 410. Similarly, the left lead transducer 416 can play back substantially the left input signal without significant modification via the left lead array 406.

In some examples, the left augmentation array 408 and/or the right augmentation array 412 can be configured to augment (e.g., at least partially cancel or destructively interfere with, or alternatively to at least partially add or constructively interfere with) the output of the lead driver arrays 406 and 410, respectively, over particular frequency ranges. In particular, lower frequency audio tends to be omnidirectional and as such is less amenable to beamforming techniques, while higher frequency audio tends to be highly directional and as such may require less beamforming or other augmentation of directionality. Accordingly, array augmentation may efficiently target low and mid-range frequency ranges that are particularly susceptible to "leakage" (e.g., the audio output extends over a wider spatial area around the acoustic axis than desired) but which can be addressed using beamforming techniques. In various examples, the augmentation arrays can include or be limited to audio output of a frequency range between about 1 Hz to about 2 kHz, or between about 250 to about 500 Hz.

Although the various arrays 406, 408, 410, 412 are shown as schematically separate (and being combined via modules 414, 418), one of skill in the art will understand that these various arrays can be mathematically combined and implemented as a single array transfer function that receives a plurality of input signals and drives output via a plurality of transducers.

As shown in FIG. 4, the left input signal 402 is provided to left lead array 406 and left augmentation array 408, and the right input signal 404 is provided to the right lead array 410 and the right augmentation array 412. Each of the arrays 406, 408, 410, 412 can be configured to process the received input signal by applying a transfer function thereto and producing processed audio signals. In some embodiments, the number of transducers can be increased, e.g., to accommodate more than two acoustic axes. For example, the system 400 can include three transducers to accommodate three input signals (e.g., left, right, and center) and three corresponding acoustic axes. In such instances, the augmentation arrays can be supplied to multiple non-lead transducers. For example, with the addition of a center input signal and a center lead transducer, the left augmentation array 408 can be provided to (e.g., drive the output of) both the right lead transducer 420 and the center lead transducer. Similarly, the right augmentation array 410 would be provided to both the left lead transducer 416 and to center lead transducer. As a result, each transducer may output audio based both on (1) its corresponding lead array input (e.g., the left lead transducer 416 outputs left channel audio via the left lead array 406) and (2) one or more augmentation array inputs configured to augment directionality of other channels output via other transducers (e.g., the left lead transducer 416 outputs the right augmentation array 412 to enhance the directionality of the right input signal as output via the right lead transducer 420).

The augmentation arrays can be generated using any suitable techniques to produce audio output by non-lead transducers that at least partially augments (e.g., by canceling and/or destructively interfering with, or alternatively by adding or constructively interfering with) the output of a lead transducer over certain spatial regions. In some examples, an augmentation array can be generated by defining a spatial region of interest for offsetting the audio generated by the lead transducer. A spatial "stop band" can be defined as an area spatially offset from the acoustic axis of the lead transducer, for example an area greater than 30 degrees angularly offset from the acoustic axis of the lead transducer. In such a configuration, the augmentation array can be designed to offset the lead transducer output within the stop band to the greatest extent possible. By setting the target of the augmentation array to be the negative complex amplitude of the lead transducer at particular angles (e.g., within the stop band), the augmentation array destructively interferes with output of the lead transducer within the stop band. The result is increased directivity of the audio output along the acoustic axis of the lead transducer.

In some embodiments, the edges of the stop band can be smoothed such that there is not a dramatic shift in the target value of the augmentation array at the edge of the stop band, but rather a gradual transition between a target of full cancellation (e.g., the negative complex amplitude of the lead transducer) and the target of no interaction (e.g., augmentation array at 0 value outside of the stop band). Once the augmentation array is generated, the degree of augmentation can be adjusted by linearly scaling (up or down) the values of the augmentation array.

Figure 5:
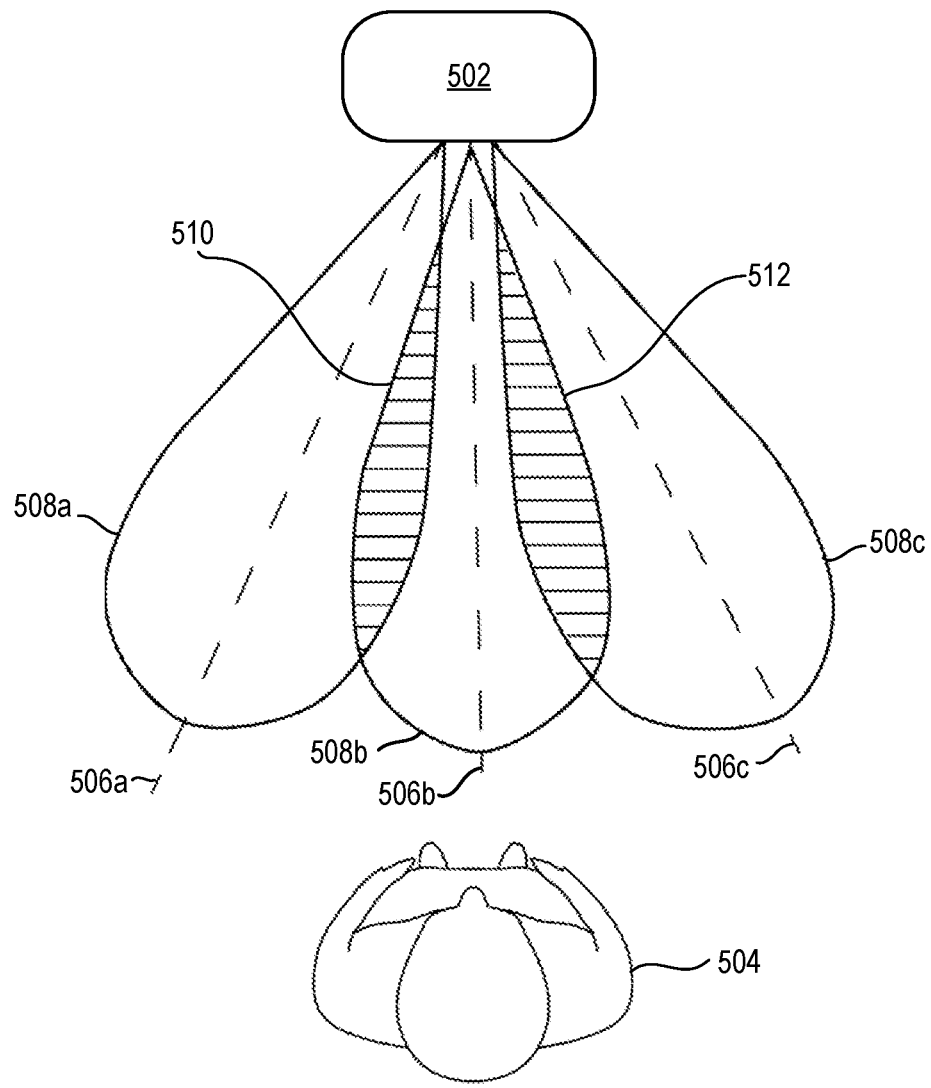
FIG. 5 is a schematic illustration of a multi-transducer playback device utilizing array augmentation to enhance directivity according to some aspects of the present technology.

FIG. 5 is a schematic illustration of a playback device 502 outputting multi-channel audio to a user 504. In the illustrated example, the playback device 502 can have three transducers: a first that outputs audio along a first acoustic axis 506a, a second that outputs audio along a second acoustic axis 506b, and a third that outputs audio along a third acoustic axis 506c. Additionally or alternatively, a plurality of transducers can be used to generate any of the illustrated audio outputs along the various acoustic axes 506a-c. The acoustic outputs along these axes are schematically illustrated as lobes 508a, 508b, and 508c, respectively. As illustrated, the first lobe 508a and the second lobe 508b spatially overlap in region 510, and the second lobe 508b and the third lobe 508c spatially overlap in region 512. These overlapping areas schematically illustrate spatial regions in which output from one transducer (or set of transducers) spatially aligns or overlaps with output from another transducer. This overlapping region can enable the use of cancellation (e.g., destructive interference) to enhance directionality.

For example, the first transducer can output left channel output along the first acoustic axis 506a, while the second (and optionally third) transducers can output offsetting audio (e.g., as determined by one or more augmentation arrays) along the second and third sound axes 508b and 508c that destructively interferes with the first channel output along region 510. As shown, this region 510 is spatially offset from the first acoustic axis 506a, and as such reduction of the left channel audio output in this region enhances the directionality of the left channel audio output via the playback device 502, effectively narrowing the spatial output. Although the acoustic axes are shown as being angled and divergent with respect to one another, in various embodiments the acoustic axes may be parallel or even convergent.

Similarly, the first playback device can output offsetting audio along the first acoustic axis 506a that destructively interferes with center channel audio output played back via the second transducer along the second acoustic axis 506b. Concurrently, the third playback device can output offsetting audio along the third acoustic axis 506c that destructively interferes with center channel audio output played back via the second transducer along the second acoustic axis 506b. As a result, the center channel audio output can be reduced at least in the regions 510 and 512, thereby enhancing the directivity of the center channel audio output.

Although this example shows three transducers and three sound axes, in other instances this approach can be extended to fewer or more sound axes, including those that include a vertical dimension or other such 3-dimensional sound orientations. Additionally or alternatively, any such augmentation need not necessarily be symmetrical about any axis of the playback device. For example, right channel audio may be augmented (e.g., having increased directivity) by output of a non-lead transducers, while left channel audio may not be so augmented (or may be augmented to a lesser degree). Such approaches may be desirable depending on, for example, the surrounding environment, the position of acoustically reflective surfaces nearby, etc. Moreover, in some embodiments the augmenting can include constructive interference rather than destructive interference, thereby spatially widening the combined output for a given channel as compared to the output of a lead transducer alone.

Figure 6:
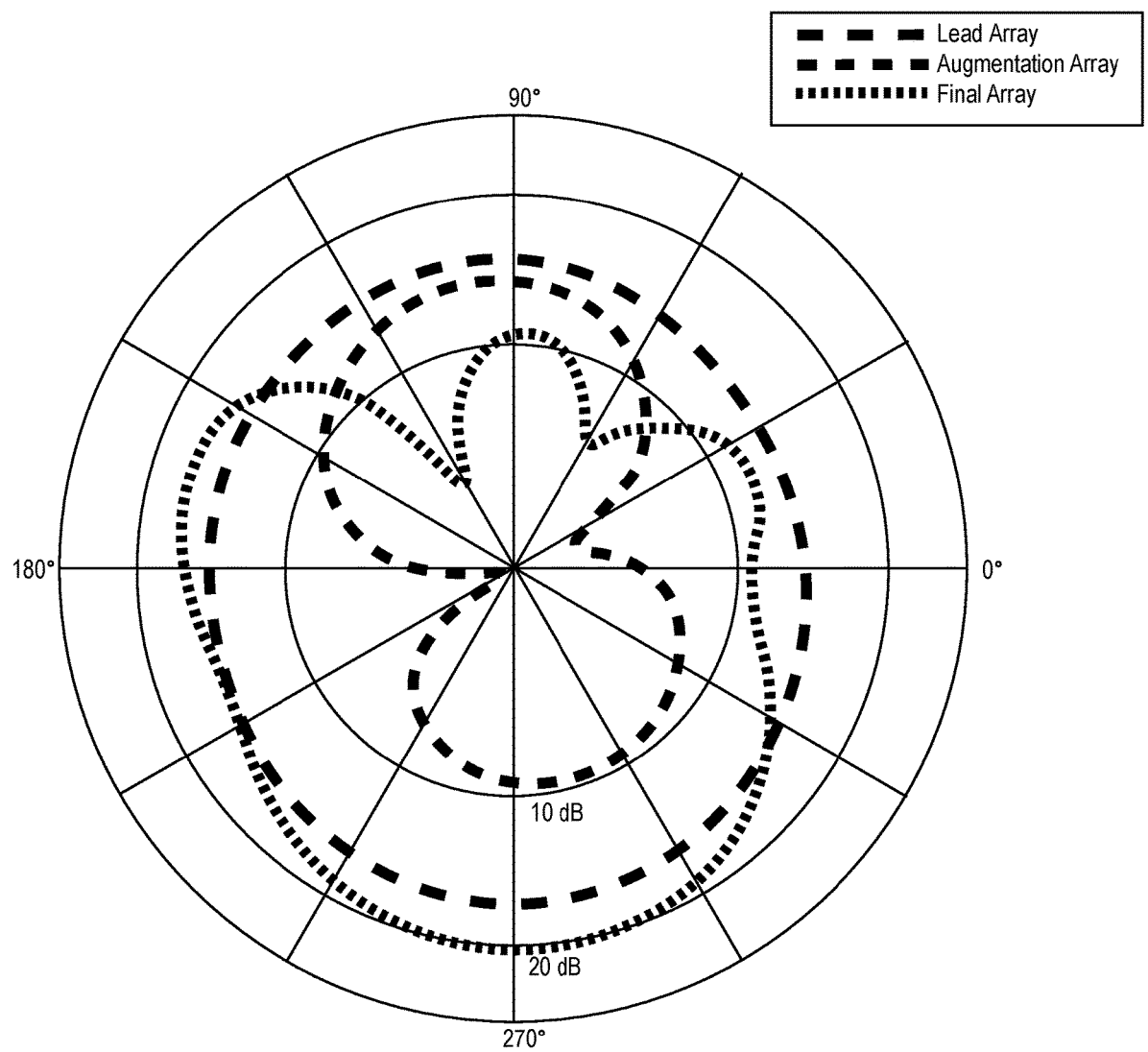
FIG. 6 is a polar plot illustrating sound pressure levels for an audio transducer using various array transfer functions.

FIG. 6 is a polar plot showing audio output as generated by a lead array, an augmentation array, and a final array that combines the two, all for a given frequency (here 315 Hz). For example, the lead array, which is shown here as being substantially omnidirectional, may be a right channel audio output via a right lead transducer. The augmentation array can be output via other transducers in the playback device (e.g., left and center transducers of a three-transducer playback device). The augmentation array output can be configured to interact with the output of the lead array in a manner that alters (e.g., enhances or increases) the directivity of the combined output. For example, the augmentation array can destructively interfere with the lead array output at least within certain spatial regions such that the combined output (shown as the Final Array in FIG. 6) has a different spatial profile than the lead array output. As shown in FIG. 6, the final array has increased directivity, with a reduced output along a range from about 30 to about 150 degrees as compared to the lead array output.

The plot diagram shown in FIG. 6 is one example shown for purposes of illustration, and one of skill in the art will understand that any configuration of an augmentation array can be used to achieve various desired directivity profiles or other spatial configurations of the combined final array. Additionally, as noted previously, the augmentation array output may vary over different frequency ranges, or may operate only over some predefined frequency range. In such instances, outside of the predefined frequency range, the lead array output and the final array output can be substantially identical.

Figure 7:
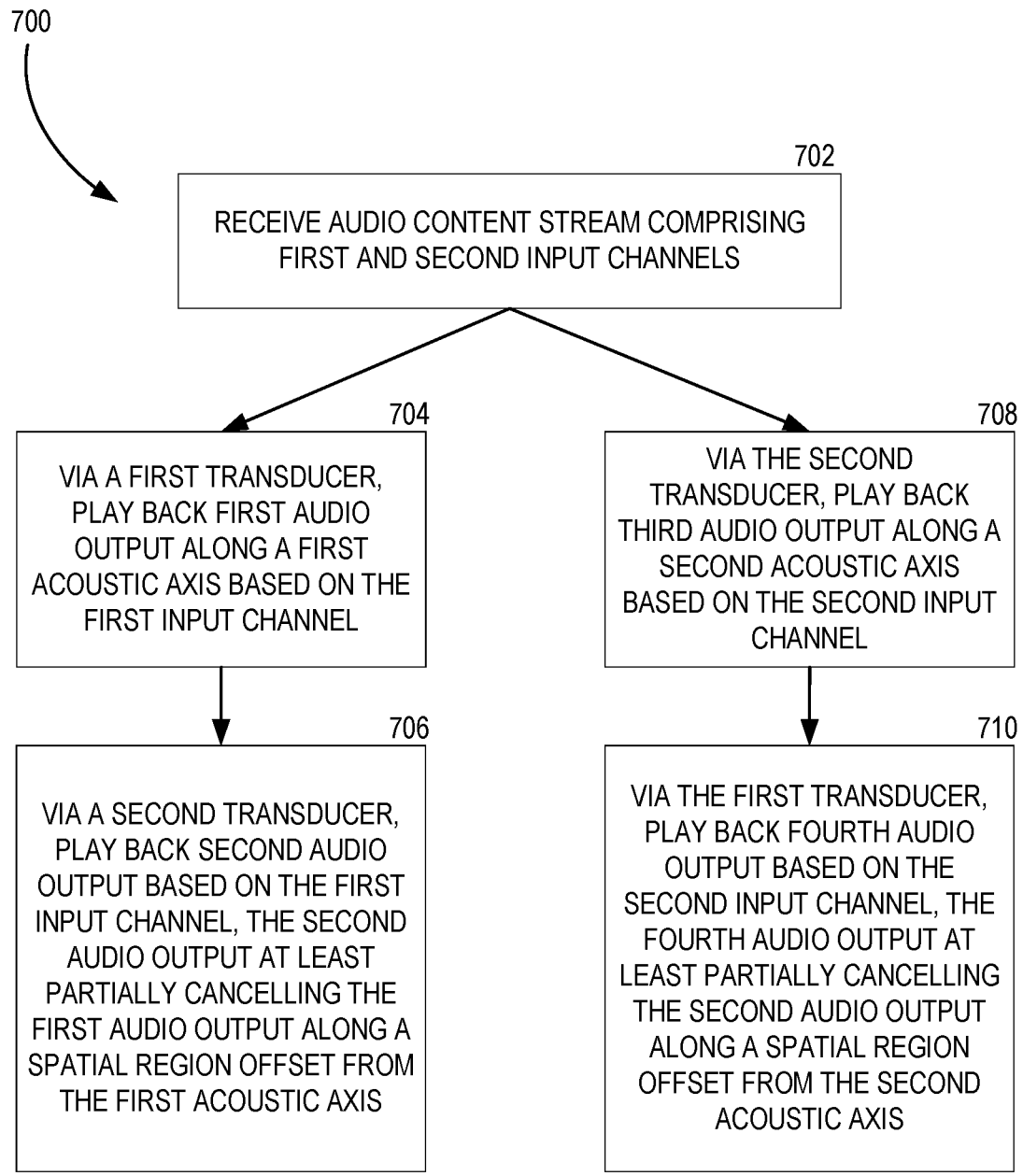
FIG. 7 is a flow diagram of a method for processing audio content to provide audio output signals to a plurality of transducers, in accordance with aspects of the present technology.

FIG. 7 is a flow diagram of a method 700 for processing audio content to provide audio output signals to a plurality of transducers, in accordance with aspects of the present technology. In some embodiments, the method 700 includes one or more instructions stored in memory (e.g., the memory 112b of FIG. 1) and executed by one or more processors (e.g., the process 112a of FIG. 1) of a playback device (e.g., the playback device 110 of FIG. 1).

The method 700 begins at block 702 with receiving, e.g., at a playback device, an audio content stream comprising at least first and second input channels (e.g., left and right input channels). The audio content stream can correspond to the audio content described elsewhere herein, e.g., with reference to FIG. 3. For example, the audio content can comprise standalone audio content or video-associated audio content. As described in more detail elsewhere herein, in some embodiments the audio content can include both first audio content corresponding to standalone audio and second audio content corresponding to video-associated audio. In such embodiments, the audio content may be processed based on its type and/or the number of input channel signals of the audio content.

The process 700 further comprises, at block 704, playing back, via first transducer of the playback device, first audio output along a first acoustic axis based on the first input channel. For example, a right transducer may output audio along a right acoustic axis based on a right input channel. Accordingly, such a right transducer can serve as a lead transducer for the right channel audio output.

At block 706, the process 700 includes playing back, via a second transducer, second audio output that is also based on the first input channel. The second audio output at least partially cancels the first audio output along a spatial region offset from the first acoustic axis. For example, a left transducer can output audio configured to augment the directionality of the right transducer output by at least partially cancelling the right transducer output in a spatial region offset from the right acoustic axis. Accordingly, in at least some embodiments, the first audio output and the second audio output can be played back concurrently such that the second audio output at least partially cancels the first audio output within the first spatial region.

Blocks 708 and 710 can be similar to blocks 704 and 706, except that the second transducer plays back a third audio output along a second acoustic axis based on the second input channel (e.g., the left transducer can output a left channel audio along a left acoustic axis), and the first transducer plays back fourth audio output that at least partially cancels the third audio output along a spatial region offset from the second acoustic axis. For example, the left transducer can output a left channel audio along a left acoustic axis, the right transducer can output augmenting (e.g., at least partially cancelling or otherwise modifying the spatial properties of) the left channel audio within a spatial region offset from the left acoustic axis. This augmentation can increase the directivity of the left channel audio output. Taken together, each transducer outputs an audio signal based on a respective input channel (e.g., as a lead transducer for that particular channel) while simultaneously outputting an augmenting audio signal based on other channels, with the augmenting audio signal configured to enhance a directivity of the output of the other transducer.

The configurations of transducers, input channels, and acoustic axes described herein can be extended to additional sets of transducers, input channels, and/or additional sound axes (e.g., three, four, five more sound axes). As previously described, processing audio content may be based on the number of input channels of the audio content received, as well as the number, type, orientation, and capabilities of the various transducers of a given playback device.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1. A playback device comprising: a first transducer configured to output audio along a first acoustic axis; a second transducer configured to output audio along a second acoustic axis different from the first; one or more processors; and data storage having instructions stored therein that, when executed by the one or more processors, cause the playback device to perform operations comprising: receiving, at the playback device, a source stream of audio content comprising at least a first input channel and a second input channel; playing back first audio output via the first transducer based on the first input channel, the first audio output directed along the first acoustic axis; playing back second audio output via the second transducer based on the first input channel, wherein the second audio output at least partially cancels the first audio output along a first spatial region offset from the first acoustic axis; playing back third audio output via the second transducer based on the second input channel, the third audio output directed along the second acoustic axis; and playing back fourth audio output via the first transducer based on the second input channel, wherein the fourth audio output at least partially cancels the third audio output along a second spatial region offset from the second acoustic axis.

Example 2. The playback device of any of the preceding Examples, wherein playing back the third audio output and the fourth audio output is concurrent with playing back the first audio output and the second audio output.

Example 3. The playback device of any of the preceding Examples, wherein the first transducer is a lead transducer for the first input channel, and wherein the second transducer is a lead transducer for the second input channel.

Example 4. The playback device of any of the preceding Examples, further comprising a third transducer configured to output audio along a third acoustic axis different from the first and second acoustic axes, wherein the source stream of audio content further comprises a third input channel, and wherein the operations further comprise: playing back the second audio output via the second and third transducers based on the first input channel, wherein the second audio output at least partially cancels the first audio output along the first spatial region offset from the first acoustic axis; and playing back the fourth audio output via the first and third transducers based on the second input channel, wherein the fourth audio output at least partially cancels the third audio output along the second spatial region offset from the second acoustic axis.

Example 5. The playback device of any of the preceding Examples, wherein the first, second, and third input channels comprise left, right, and center input channels, respectively.

Example 6. The playback device of any of the preceding Examples, wherein the first spatial region comprises a region angularly offset from the first acoustic axis, and wherein the second spatial region comprises a region angularly offset from the second acoustic axis.

Example 7. The playback device of any of the preceding Examples, wherein the first spatial region is angularly offset from the first acoustic axis by at least about 30 degrees, and wherein the second spatial region is angularly offset from the second acoustic axis by at least about 30 degrees.

Example 8. The playback device of any of the preceding Examples, wherein the second audio output at least partially canceling the first audio output comprises primarily audio between about 250-500 Hz, and wherein the fourth audio output at least partially canceling the second audio output comprises primarily audio between about 250-500 Hz.

Example 9. The playback device of any of the preceding Examples, wherein the second audio output is approximately 180 degrees out of phase with the first audio output over a predefined frequency range, and wherein the fourth audio output is approximately 180 degrees out of phase with the third audio output over a predefined frequency range.

Example 10. A method, comprising: receiving, at a playback device, a source stream of audio content comprising at least a first input channel and a second input channel; via a first transducer of the playback device, playing back first audio output along a first acoustic axis based on the first input channel; via a second transducer of the playback device, playing back second audio output based on the first input channel, wherein the second audio output at least partially cancels the first audio output along a spatial region offset from the first acoustic axis; via the second transducer, playing back third audio output along a second acoustic axis based on the second input channel; and via the first transducer, playing back fourth audio output based on the second input channel, wherein the fourth audio output at least partially cancels the third audio output along a second spatial region offset from the second acoustic axis.

Example 11. The method of any of the preceding Examples, wherein playing back the third audio output and the fourth audio output is concurrent with playing back the first audio output and the second audio output.

Example 12. The method of any of the preceding Examples, wherein the first transducer is a lead transducer for the first input channel, and wherein the second transducer is a lead transducer for the second input channel.

Example 13. The method of any of the preceding Examples, wherein the playback device further includes a third transducer configured to output audio along a third acoustic axis different from the first and second acoustic axes, wherein the source stream of audio content further comprises a third input channel, and wherein the method further comprises: playing back the second audio output via the second and third transducers based on the first input channel, wherein the second audio output at least partially cancels the first audio output along the first spatial region offset from the first acoustic axis; and playing back the fourth audio output via the first and third transducers based on the second input channel, wherein the fourth audio output at least partially cancels the third audio output along the second spatial region offset from the second acoustic axis.

Example 14. The method of any of the preceding Examples, wherein the first, second, and third input channels comprise left, right, and center input channels, respectively.

Example 15. The method of any of the preceding Examples, wherein the first spatial region comprises a region angularly offset from the first acoustic axis, and wherein the second spatial region comprises a region angularly offset from the second acoustic axis.

Example 16. The method of any of the preceding Examples, wherein the first spatial region is angularly offset from the first acoustic axis by at least about 30 degrees, and wherein the second spatial region is angularly offset from the second acoustic axis by at least about 30 degrees.

Example 17. The method of any of the preceding Examples, wherein the second audio output at least partially canceling the first audio output comprises primarily audio between about 250-500 Hz, and wherein the fourth audio output at least partially canceling the second audio output comprises primarily audio between about 250-500 Hz.

Example 18. The method of any of the preceding Examples, wherein the second audio output is approximately 180 degrees out of phase with the first audio output over a predefined frequency range, and wherein the fourth audio output is approximately 180 degrees out of phase with the third audio output over a predefined frequency range.

Example 19. A non-transitory computer-readable medium storing instructions that, when executed by one or more processors of a playback device, cause the playback device to perform operations comprising: receiving, at the playback device, a source stream of audio content comprising at least a first input channel and a second input channel; via a first transducer of the playback device, playing back first audio output along a first acoustic axis based on the first input channel; and via a second transducer of the playback device, playing back second audio output based on the first input channel, wherein the second audio output at least partially cancels the first audio output along a spatial region offset from the first acoustic axis; via the second transducer, playing back third audio output along a second acoustic axis based on the second input channel; and via the first transducer, playing back fourth audio output based on the second input channel, wherein the fourth audio output at least partially cancels the third audio output along a second spatial region offset from the second acoustic axis.

Example 20. The computer-readable medium of any of the preceding Examples, wherein playing back the third audio output and the fourth audio output is concurrent with playing back the first audio output and the second audio output.

Example 21. The computer-readable medium of any of the preceding Examples, wherein the first transducer is a lead transducer for the first input channel, and wherein the second transducer is a lead transducer for the second input channel.

Example 22. The computer-readable medium of any of the preceding Examples, wherein the playback device further includes a third transducer configured to output audio along a third acoustic axis different from the first and second acoustic axes, wherein the source stream of audio content further comprises a third input channel, and wherein the operations further comprise: playing back the second audio output via the second and third transducers based on the first input channel, wherein the second audio output at least partially cancels the first audio output along the first spatial region offset from the first acoustic axis; and playing back the fourth audio output via the first and third transducers based on the second input channel, wherein the fourth audio output at least partially cancels the third audio output along the second spatial region offset from the second acoustic axis.

Example 23. The computer-readable medium of any of the preceding Examples, wherein the first, second, and third input channels comprise left, right, and center input channels, respectively.

Example 24. The computer-readable medium of any of the preceding Examples, wherein the first spatial region comprises a region angularly offset from the first acoustic axis, and wherein the second spatial region comprises a region angularly offset from the second acoustic axis.

Example 25. The computer-readable medium of any of the preceding Examples, wherein the first spatial region is angularly offset from the first acoustic axis by at least about 30 degrees, and wherein the second spatial region is angularly offset from the second acoustic axis by at least about 30 degrees.

Example 26. The computer-readable medium of any of the preceding Examples, wherein the second audio output at least partially canceling the first audio output comprises primarily audio between about 250-500 Hz, and wherein the fourth audio output at least partially canceling the second audio output comprises primarily audio between about 250-500 Hz.

Example 27. The computer-readable medium of any of the preceding Examples, wherein the second audio output is approximately 180 degrees out of phase with the first audio output over a predefined frequency range, and wherein the fourth audio output is approximately 180 degrees out of phase with the third audio output over a predefined frequency range.

Example 28. A method comprising: receiving audio input at a playback device comprising a plurality of transducers including a lead transducer and one or more augmenting transducers; spatially filtering the audio input to provide a lead output configured to be played back via the lead transducer and an augmenting output configured to be played back via the augmenting transducer(s), wherein the lead output is not substantially altered with respect to the audio input by the spatial filtering and wherein the augmenting output is substantially altered with respect to the audio input by the spatial filtering; playing back, via the lead transducer, the lead output; and playing back, via the augmenting transducer(s), the augmenting output, wherein the augmenting output augments a directionality of the lead output.

Example 29. The method of any of the preceding Examples, wherein spatial filtering the audio input does not alter the lead output with respect to the audio content.

Example 30. The method of any of the preceding Examples, wherein the spatial filtering alters the augmenting output with respect to the audio input to a greater extent than the spatial filtering alters the lead output with respect to the audio input.

Example 31. The method of any of the preceding Examples, wherein spatially filtering the audio input comprises applying an array transfer function to the audio input.

Example 32. The method of any of the preceding Examples, wherein augmenting the directionality comprises spatially widening or narrowing a combined output of the transducers with respect to the lead output.

Example 33. The method of any of the preceding Examples, wherein augmenting the directionality comprises constructive or destructive interference with the lead output.

Example 34. The method of any of the preceding Examples, wherein the audio input comprises single-channel audio content.

Example 35. The method of any of the preceding Examples, wherein: the audio input is a first channel input of multi-channel audio input, the method further comprising receiving a second channel input of the multi-channel audio input; the lead transducer is a first-channel lead transducer; the augmenting transducer(s) are first-channel augmenting transducer(s); the lead output is a first lead output; the augmenting output is a first augmenting output; one of the augmenting transducer(s) also serves as a second-channel lead transducer; and the playback device further comprises one or more second-channel augmenting transducer(s), the second-channel augmenting transducer(s) including at least the first-channel lead transducer; the method further comprising: spatially filtering the second channel input to provide a second lead output configured to be played back via the second-channel lead transducer and a second-channel augmenting output configured to be played back via the second-channel augmenting transducers; playing back, via the second-channel lead transducer, the second lead output; and playing back, via the second-channel augmenting transducer(s), the second augmenting output, wherein the second augmenting output augments a directionality of the second lead output.

Example 36. The method of any of the preceding Examples, wherein the lead output is centered along an acoustic axis, and the combined output of the lead output and the augmenting output is centered along substantially the same acoustic axis.

Example 36. The method of any of the preceding Examples, the lead output comprises a greater frequency range than the augmenting audio output.

Example 37. The method of any of the preceding Examples, wherein the augmenting audio output is primarily audio between about 250-500 Hz.

Example 38. A non-transitory computer-readable medium storing instructions that, when executed by one or more processors of a playback device, cause the playback device to perform operations comprising the method of any one of any of the preceding Examples.

Example 39. A playback device comprising: a plurality of transducers including at least a lead transducer and one or more augmenting transducers; one or more processors; and the computer-readable medium of any of the preceding Examples.

The invention claimed is:
1. A playback device comprising:
a first transducer configured to output audio along a first acoustic axis;
a second transducer configured to output audio along a second acoustic axis different from the first;

a third transducer configured to output audio along a third acoustic axis different from the first and second acoustic axes;
one or more processors; and
data storage having instructions stored therein that, when executed by the one or more processors, cause the playback device to perform operations comprising:
receiving, at the playback device, a source stream of audio content comprising at least a first input channel, a second input channel, and a third input channel;
playing back first audio output via the first transducer based on the first input channel, the first audio output directed along the first acoustic axis;
playing back second audio output via the second transducer and the third transducer based on the first input channel, wherein the second audio output at least partially cancels the first audio output along a first spatial region offset from the first acoustic axis;
playing back third audio output via the second transducer based on the second input channel, the third audio output directed along the second acoustic axis; and
playing back fourth audio output via the first transducer and the third transducer based on the second input channel, wherein the fourth audio output at least partially cancels the third audio output along a second spatial region offset from the second acoustic axis.

2. The playback device of claim 1, wherein playing back the third audio output and the fourth audio output is concurrent with playing back the first audio output and the second audio output.

3. The playback device of claim 1, wherein the first transducer is a lead transducer for the first input channel, and wherein the second transducer is a lead transducer for the second input channel.

4. The playback device of claim 1, wherein the first spatial region comprises a region angularly offset from the first acoustic axis, and wherein the third spatial region comprises a region angularly offset from the second acoustic axis.

5. The playback device of claim 1, wherein the second audio output at least partially canceling the first audio output comprises primarily audio between about 250-500 Hz, and wherein the fourth audio output at least partially canceling the third audio output comprises primarily audio between about 250-500 Hz.

6. The playback device of claim 1, wherein the second audio output is approximately 180 degrees out of phase with the first audio output over a predefined frequency range, and wherein the fourth audio output is approximately 180 degrees out of phase with the third audio output over a predefined frequency range.

7. A method, comprising:
receiving, at a playback device, a source stream of audio content comprising at least a first input channel, a second input channel, and a third input channel;
via a first transducer of the playback device, playing back first audio output along a first acoustic axis based on the first input channel;
via a second transducer and a third transducer of the playback device, playing back second audio output based on the first input channel, wherein the second audio output at least partially cancels the first audio output along a spatial region offset from the first acoustic axis;
via the second transducer, playing back third audio output along a second acoustic axis based on the second input channel; and
via the first transducer and a third transducer, playing back fourth audio output based on the second input channel, wherein the fourth audio output at least partially cancels the third audio output along a second spatial region offset from the second acoustic axis.

8. The method of claim 7, wherein playing back the third audio output and the fourth audio output is concurrent with playing back the first audio output and the second audio output.

9. The method of claim 7, wherein the first transducer is a lead transducer for the first input channel, and wherein the second transducer is a lead transducer for the second input channel.

10. The method of claim 7, wherein the first spatial region comprises a region angularly offset from the first acoustic axis, and wherein the second spatial region comprises a region angularly offset from the second acoustic axis.

11. The method of claim 7, wherein the second audio output at least partially canceling the first audio output comprises primarily audio between about 250-500 Hz, and wherein the fourth audio output at least partially canceling the third audio output comprises primarily audio between about 250-500 Hz.

12. The method of claim 7, wherein the second audio output is approximately 180 degrees out of phase with the first audio output over a predefined frequency range, and wherein the fourth audio output is approximately 180 degrees out of phase with the third audio output over a predefined frequency range.

13. A non-transitory computer-readable medium storing instructions that, when executed by one or more processors of a playback device, cause the playback device to perform operations comprising:
receiving, at the playback device, a source stream of audio content comprising at least a first input channel, a second input channel, and a third input channel;
via a first transducer of the playback device, playing back first audio output along a first acoustic axis based on the first input channel; and
via a second transducer and a third transducer of the playback device, playing back second audio output based on the first input channel, wherein the second audio output at least partially cancels the first audio output along a spatial region offset from the first acoustic axis;
via the second transducer, playing back third audio output along a second acoustic axis based on the second input channel; and
via the first transducer and the third transducer, playing back fourth audio output based on the second input channel, wherein the fourth audio output at least partially cancels the third audio output along a second spatial region offset from the second acoustic axis.

14. The computer-readable medium of claim 13, wherein playing back the third audio output and the fourth audio output is concurrent with playing back the first audio output and the second audio output.

15. The computer-readable medium of claim 13, wherein the first spatial region comprises a region angularly offset from the first acoustic axis, and wherein the second spatial region comprises a region angularly offset from the second acoustic axis.

16. The computer-readable medium of claim 13, wherein the second audio output at least partially canceling the first audio output comprises primarily audio between about 250-500 Hz, and wherein the fourth audio output at least partially canceling the third audio output comprises primarily audio between about 250-500 Hz.

17. The computer-readable medium of claim 13, wherein the second audio output is approximately 180 degrees out of phase with the first audio output over a predefined frequency range, and wherein the fourth audio output is approximately 180 degrees out of phase with the third audio output over a predefined frequency range.

* * * * *

UNITED STATES PATENT AND TRADEMARK OFFICE
CERTIFICATE OF CORRECTION

PATENT NO. : 11,974,106 B2
APPLICATION NO. : 17/451037
DATED : April 30, 2024
INVENTOR(S) : Lehnert et al.

Page 1 of 1

It is certified that error appears in the above-identified patent and that said Letters Patent is hereby corrected as shown below:

In the Claims

In Column 31, in Claim 4, Line 41, delete "third" and insert -- second --, therefor.

In Column 32, in Claim 7, Line 4, delete "a third" and insert -- the third --, therefor.

Signed and Sealed this
Fourth Day of June, 2024

Katherine Kelly Vidal
Director of the United States Patent and Trademark Office